US012415295B2

(12) United States Patent
Steckling et al.

(10) Patent No.: US 12,415,295 B2
(45) Date of Patent: Sep. 16, 2025

(54) JOBSITE OPERATIONAL STATUS DETECTION FOR CONCRETE TRUCKS

(71) Applicant: Oshkosh Corporation, Oshkosh, WI (US)

(72) Inventors: Scott Steckling, Oshkosh, WI (US); Raymond Ryan, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 948 days.

(21) Appl. No.: 17/519,731

(22) Filed: Nov. 5, 2021

(65) Prior Publication Data

US 2022/0143869 A1 May 12, 2022

Related U.S. Application Data

(60) Provisional application No. 63/111,907, filed on Nov. 10, 2020.

(51) Int. Cl.
*B28C 5/42* (2006.01)

(52) U.S. Cl.
CPC ............ *B28C 5/422* (2013.01); *B28C 5/4248* (2013.01); *B28C 5/4268* (2013.01); *B28C 5/4272* (2013.01)

(58) Field of Classification Search
CPC ..... B28C 5/4217; B28C 5/422; B28C 5/4272; B28C 5/4248; B28C 5/4268; B28C 7/02; B60P 3/16; B60R 16/023; B62D 61/12; G01F 23/22; G01F 23/0007; G01L 17/00; G01P 3/00; G01S 19/52; B60C 23/001; B60C 23/002; B60C 23/04; G08G 1/20
USPC ........................................................ 366/53–68
See application file for complete search history.

(56) References Cited

U.S. PATENT DOCUMENTS

| | | | |
|---|---|---|---|
| 6,918,481 | B2 | 7/2005 | Quigley et al. |
| 6,938,749 | B1 | 9/2005 | Quigley et al. |
| 7,931,397 | B2 | 4/2011 | Lindblom et al. |
| 8,287,173 | B2 | 10/2012 | Khouri |
| 8,613,543 | B2 | 12/2013 | Lindblom et al. |
| 8,646,965 | B2 | 2/2014 | Datema et al. |
| 10,239,403 | B2 | 3/2019 | Broker et al. |
| 10,414,067 | B2 | 9/2019 | Datema et al. |
| 10,792,613 | B1 | 10/2020 | Drake et al. |

(Continued)

FOREIGN PATENT DOCUMENTS

DE 60036650 T2 * 7/2008 ............ B28C 5/422

*Primary Examiner* — Charles Cooley
(74) *Attorney, Agent, or Firm* — Foley & Lardner LLP

(57) ABSTRACT

A vehicle includes a chassis, a cab, a drum coupled to the chassis and configured to mix a concrete mixture received therein and selectively dispense the concrete mixture, a chute configured to be operable between a raised position and a lowered position such that, when in the lowered position, the chute is configured to receive the concrete mixture from the drum and provide the concrete mixture to a work location, a sensor configured to detect an operational characteristic and provide signals relating to the operational characteristics, and a control system. The control system is configured to receive the signals relating to the operational characteristic from the sensor, determine, based on signals relating to the operational characteristic, when the vehicle entered an operational state, generate a timestamp indicating when the vehicle entered the operational state, provide the timestamp and the operational state to a fleet management system.

7 Claims, 5 Drawing Sheets

(56) References Cited

U.S. PATENT DOCUMENTS

| | | | |
|---|---|---|---|
| 10,843,379 B2 | 11/2020 | Rocholl et al. | |
| 10,940,610 B2 | 3/2021 | Clifton et al. | |
| 10,987,829 B2 | 4/2021 | Datema et al. | |
| 11,104,035 B1 | 8/2021 | Hou et al. | |
| 11,186,008 B2 | 11/2021 | Steffens et al. | |
| 11,186,009 B2 | 11/2021 | Bjornstad et al. | |
| 11,186,010 B2 | 11/2021 | Andringa et al. | |
| 11,260,559 B2 | 3/2022 | Wurtz et al. | |
| 12,290,959 B2 * | 5/2025 | Steffens | B28C 5/4237 |
| 2022/0143869 A1 * | 5/2022 | Steckling | B28C 5/4248 |
| 2022/0250279 A1 * | 8/2022 | Beaupre | B28C 7/022 |

* cited by examiner

JOBSITE OPERATIONAL STATUS DETECTION FOR CONCRETE TRUCKS

CROSS-REFERENCE TO RELATED APPLICATION

This application claims priority to U.S. Provisional Patent Application No. 63/111,907, filed Nov. 10, 2020, which is incorporated herein by reference in its entirety.

BACKGROUND

Concrete mixer vehicles are configured to receive, mix, and transport wet concrete or a combination of ingredients that when mixed form wet concrete to a job site. Concrete mixer vehicles include a rotatable mixer drum that mixes the concrete disposed therein and a chute for discharging the concrete.

SUMMARY

One embodiment relates to a vehicle. The vehicle includes a chassis, a cab, a drum coupled to the chassis and configured to mix a concrete mixture received therein and selectively dispense the concrete mixture, a chute configured to be operable between a raised position and a lowered position such that, when in the lowered position, the chute is configured to receive the concrete mixture from the drum and provide the concrete mixture to a work location, a sensor configured to detect an operational characteristic and provide signals relating to the operational characteristics, and a control system. The control system is configured to receive the signals relating to the operational characteristic from the sensor, determine, based on signals relating to the operational characteristic, when the vehicle entered an operational state, generate a timestamp indicating when the vehicle entered the operational state, provide the timestamp and the operational state to a fleet management system. The control system is disposed onboard, in physical association with at least one of the chassis, the cab, the drum, or the chute such that the timestamp and the operational state originate from onboard the vehicle.

Another embodiment of the present disclosure is a controller for a concrete mixing vehicle. The controller includes one or more processors and memory storing instructions that, when executed by the one or more processors, cause the one or more processors to perform operations to detect one or more operational statuses. The instructions include communicatively coupling to one or more sensors. The instructions further include receiving, from the one or more sensors, the one or more operational characteristics. The instructions further include determining, based on the one or more operational characteristics, when the vehicle entered an operational state. The instructions further include generating one or more timestamps indicating when the vehicle entered the operational state. The instructions further include providing the timestamp and the operational state to a fleet management system.

Another embodiment of the present disclosure is a method of detecting operational statuses of a fleet. The method includes detecting, by one or more sensors of a first vehicle of the fleet, one or more operational characteristics of the first vehicle. The method also includes receiving, by a first controller in physical association with the first vehicle and from the one or more sensors, the one or more operational characteristics. The method also includes determining, by the first controller and based on the one or more operational characteristics, when the vehicle entered an operational state. The method also includes generating, by the first controller, one or more timestamps indicating when the vehicle entered the operational state. The method also includes providing, by the first controller the timestamp and the operational state to a fleet management system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Concrete Mixing Truck

Figure 1:
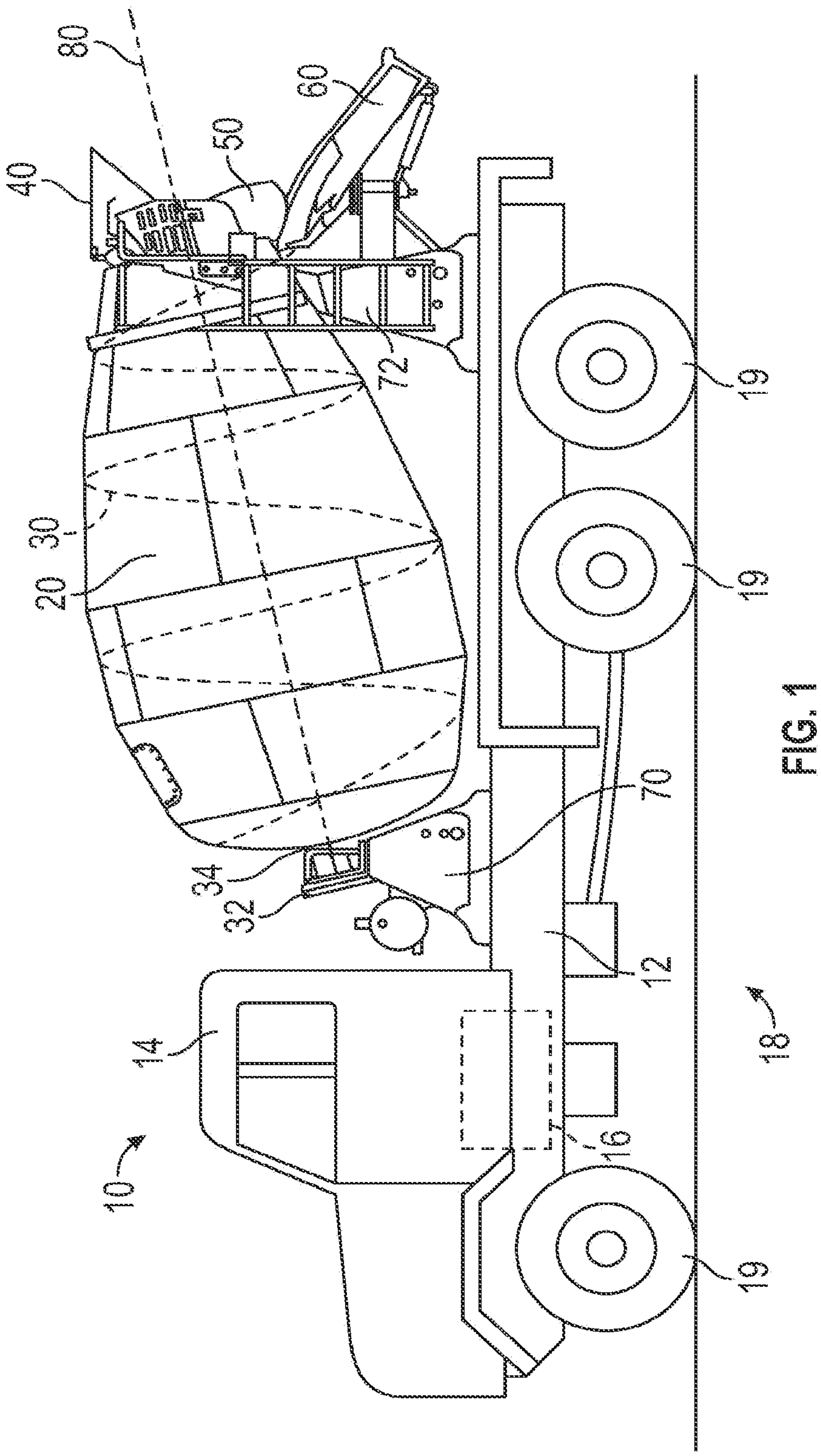
FIG. 1 is a schematic diagram of a concrete mixing truck, according to an exemplary embodiment.
Figure 2:
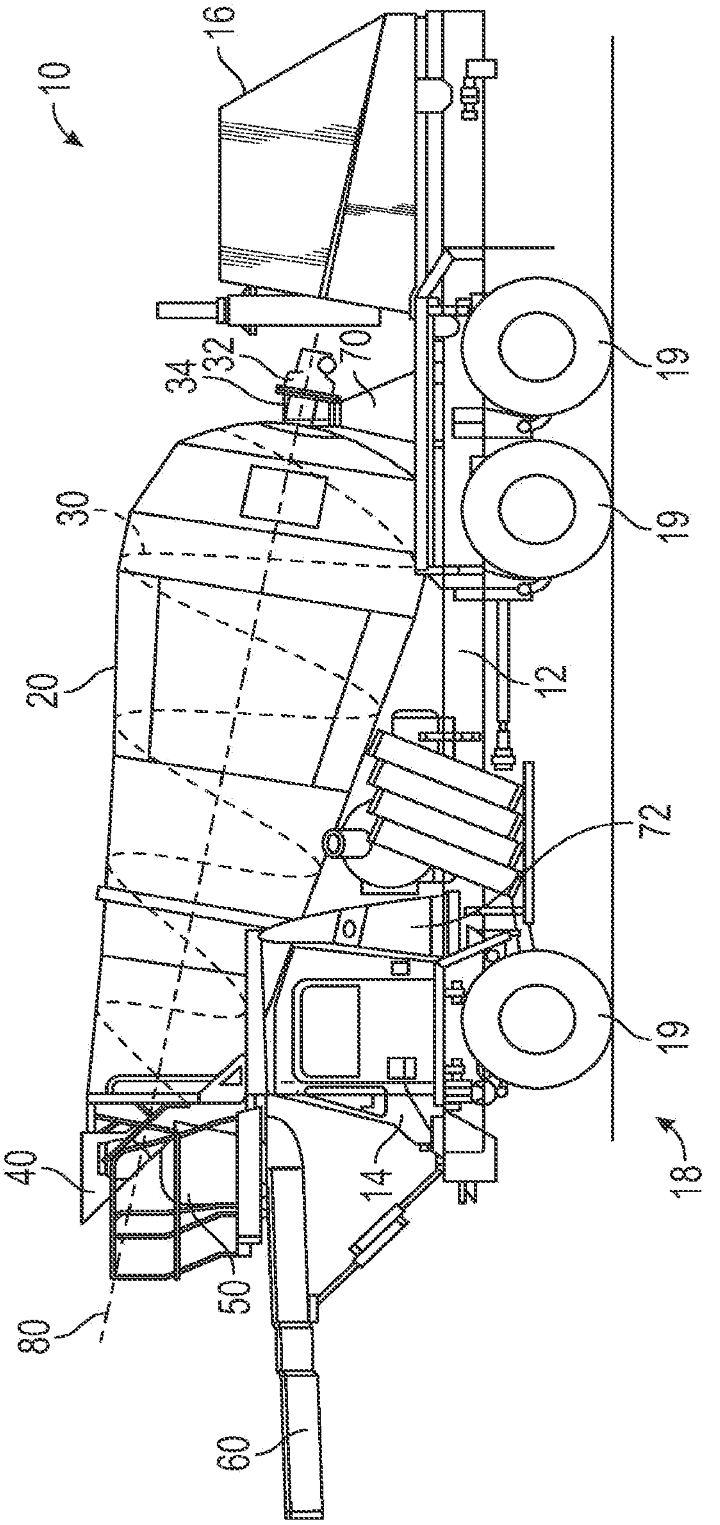
FIG. 2 is a schematic diagram of concrete mixing truck, according to another exemplary embodiment.

According to the exemplary embodiments shown in FIGS. 1 and 2, a vehicle, shown as a concrete mixing truck 10, includes a drum assembly, shown as a mixing drum 20. As shown in FIG. 1, the concrete mixing truck 10 is configured as a rear-discharge concrete mixing truck. In other embodiments, such as the embodiment shown in FIG. 2, the concrete mixing truck 10 is configured as a front-discharge concrete mixing truck. As shown in FIG. 1, the concrete mixing truck 10 includes a chassis, shown as frame 12, and a cabin, shown as cab 14, coupled to the frame 12 (e.g., at a front end thereof, etc.). The mixing drum 20 is coupled to the frame 12 and disposed behind the cab 14 (e.g., at a rear end thereof, etc.), according to the exemplary embodiment shown in FIG. 1. In other embodiments, such as the embodiment shown in FIG. 2, at least a portion of the mixing drum 20 extends beyond the front of the cab 14. The cab 14 may include various components to facilitate operation of the concrete mixing truck 10 by an operator (e.g., a seat, a steering wheel, hydraulic controls, a control panel, a control device, a user interface, switches, buttons, dials, etc.).

The concrete mixing truck 10 also includes a prime mover or primary driver, shown as engine 16. For example, the engine 16 may be coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, the engine 16 additionally or alternatively includes one or more electric motors coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 10.

The concrete mixing truck 10 may also include a transmission that is coupled to the engine 16. The engine 16 produces mechanical power (e.g., due to a combustion reaction, etc.) that may flow into the transmission. The concrete mixing truck 10 may include a vehicle drive system 18 that is coupled to the engine 16 (e.g., through the transmission). The vehicle drive system 18 may include drive shafts, differentials, and other components coupling the transmission with a ground surface to move the concrete mixing truck 10. The concrete mixing truck 10 may also include a plurality of tractive elements, shown as wheels 19 that engage a ground surface to move the concrete mixing truck 10. In one embodiment, at least a portion of the mechanical power produced by the engine 16 flows through the transmission and into the vehicle drive system 18 to power at least some of the wheels 19 (e.g., front wheels, rear wheels, etc.). In one embodiment, energy (e.g., mechanical energy, etc.) flows along a power path defined from the engine 16, through the transmission, and to the vehicle drive system 18.

As shown in FIGS. 1 and 2, the mixing drum 20 includes a mixing element (e.g., fins, etc.), shown as a mixing element 30, positioned within the interior (e.g., an internal volume) of the mixing drum 20. The mixing element 30 may be configured to (i) mix the contents of mixture within the mixing drum 20 when the mixing drum 20 is rotated (e.g., by a drum drive system) in a first direction (e.g., counterclockwise, clockwise, etc.) and (ii) drive the mixture within the mixing drum 20 out of the mixing drum 20 (e.g., through a chute, etc.) when the mixing drum 20 is rotated (e.g., by a drum drive system including a drum driver 32) in an opposing second direction (e.g., clockwise, counterclockwise, etc.). The concrete mixing truck 10 also includes an inlet (e.g., hopper, etc.), shown as charge hopper 40, a connecting structure, shown as discharge hopper 50, and an outlet, shown as chute 60. The charge hopper 40 is fluidly coupled with the mixing drum 20, which is fluidly coupled with the discharge hopper 50, which is fluidly coupled with the chute 60. In this way, wet concrete may flow into the mixing drum 20 from the charge hopper 40 and may flow out of the mixing drum 20 into the discharge hopper 50 and then into the chute 60 to be dispensed. According to an exemplary embodiment, the mixing drum 20 is configured to receive a mixture, such as a concrete mixture (e.g., cementitious material, aggregate, sand, rocks, etc.), through the charge hopper 40.

The drum driver 32 is configured to provide mechanical energy (e.g., in a form of an output torque) to rotate the mixing drum 20. The drum driver 32 may be a hydraulic motor, an electric motor, a power take off shaft coupled to the engine 16, or another type of driver. The drum driver 32 is coupled to the mixing drum 20 by a shaft, shown as drive shaft 34. The drive shaft 34 is configured to transfer the output torque to the mixing drum 20.

Figure 3:
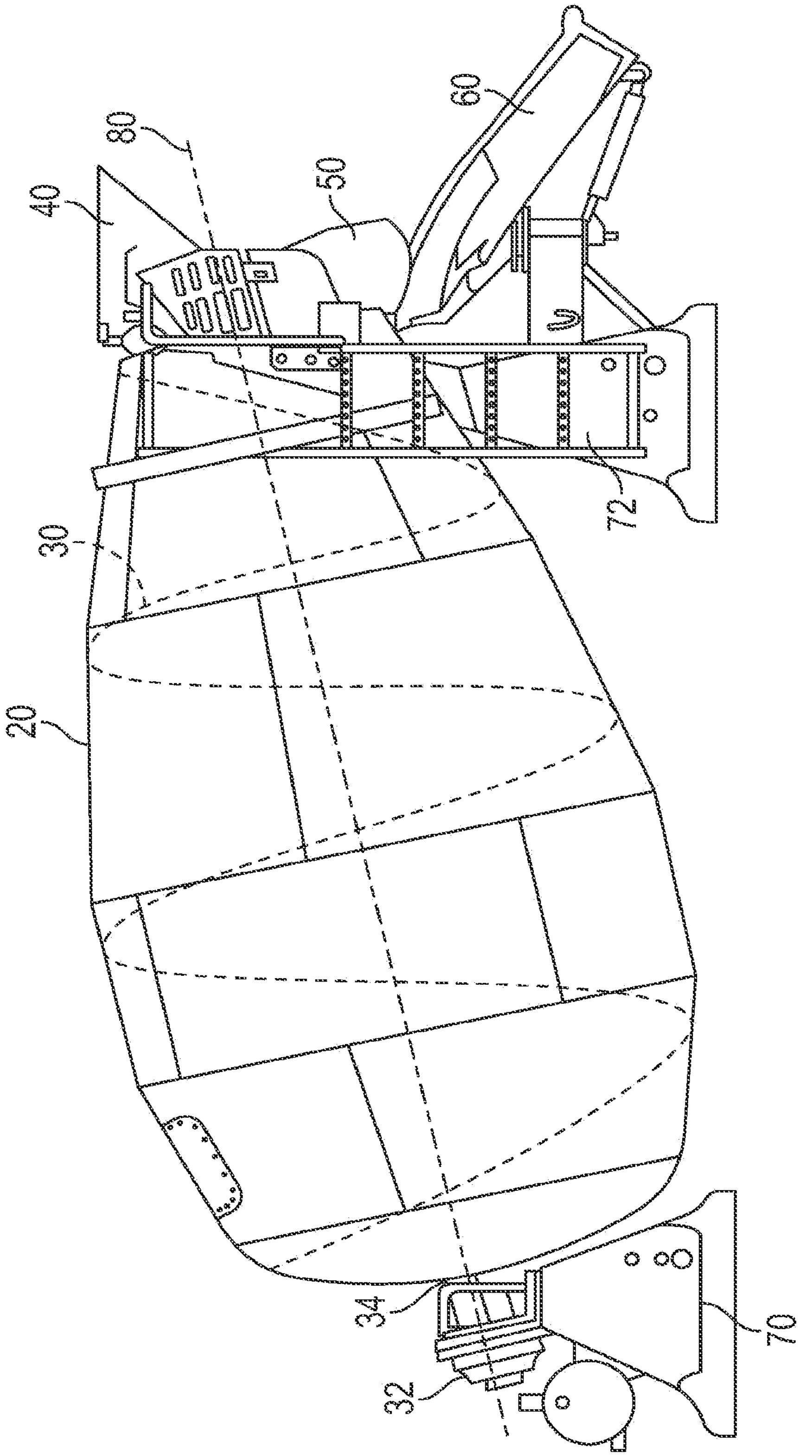
FIG. 3 is a schematic diagram of a mixing drum for a concert mixing truck, according to an exemplary embodiment.

FIG. 3 illustrates a mixing drum assembly including the mixing drum 20, the mixing element 30, the drum driver 32, the charge hopper 40, the discharge hopper 50, and the chute 60 isolated from the concrete mixing truck 10. The mixing drum 20 may be coupled to supports (e.g., pedestals, etc.), shown as pedestal 70 and pedestal 72. The pedestal 70 and the pedestal 72 may be coupled to the frame 12 of the concrete mixing truck 10. The pedestal 70 and the pedestal 72 may function to cooperatively couple (e.g., attach, secure, etc.) the mixing drum 20 to the frame 12 and facilitate rotation of the mixing drum 20 relative to the frame 12. In an alternative embodiment, such as is shown in FIG. 3, the mixing drum 20 is configured as a stand-alone mixing drum that is not coupled (e.g., fixed, attached, etc.) to a vehicle. In such an embodiment, the mixing drum 20 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIGS. 1-3, the mixing drum 20 defines a central, longitudinal axis 80. According to an exemplary embodiment, the mixing drum 20 is selectively rotated about the longitudinal axis 80 (e.g., by the drum driver 32). The longitudinal axis 80 may be angled relative to the frame (e.g., the frame 12 of the concrete mixing truck 10) such that the longitudinal axis 80 intersects with the frame. For example, the longitudinal axis 80 may be elevated from the frame at an angle in the range of five degrees to twenty degrees. In other applications, the longitudinal axis 80 may be elevated by less than five degrees (e.g., four degrees, three degrees, etc.) or greater than twenty degrees (e.g., twenty-five degrees, thirty degrees, etc.). In an alternative embodiment, the concrete mixing truck 10 includes an actuator positioned to facilitate selectively adjusting the longitudinal axis 80 to a desired or target angle (e.g., manually in response to an operator input/command, automatically according to a control scheme, etc.).

Some concrete scheduling/dispatch systems repeatedly experience operational statuses including (1) start loading the drum at a concrete plant, (2) end loading the drum at the concrete plant, (3) leaving the plant, (4) arriving at a job site, (5) starting a concrete pour from the drum, (6) ending the concrete pour from the drum, (7) start washing out the drum, (8) end washing out the drum, (9) leaving the job site, and (10) arriving back at the plant. In order to determine some operational status (e.g., a combination of one or more of statuses 5, 6, 7, and 8) of a concrete mixer truck, operators are required to manually indicate the operational status.

Status Detection

Figure 4:
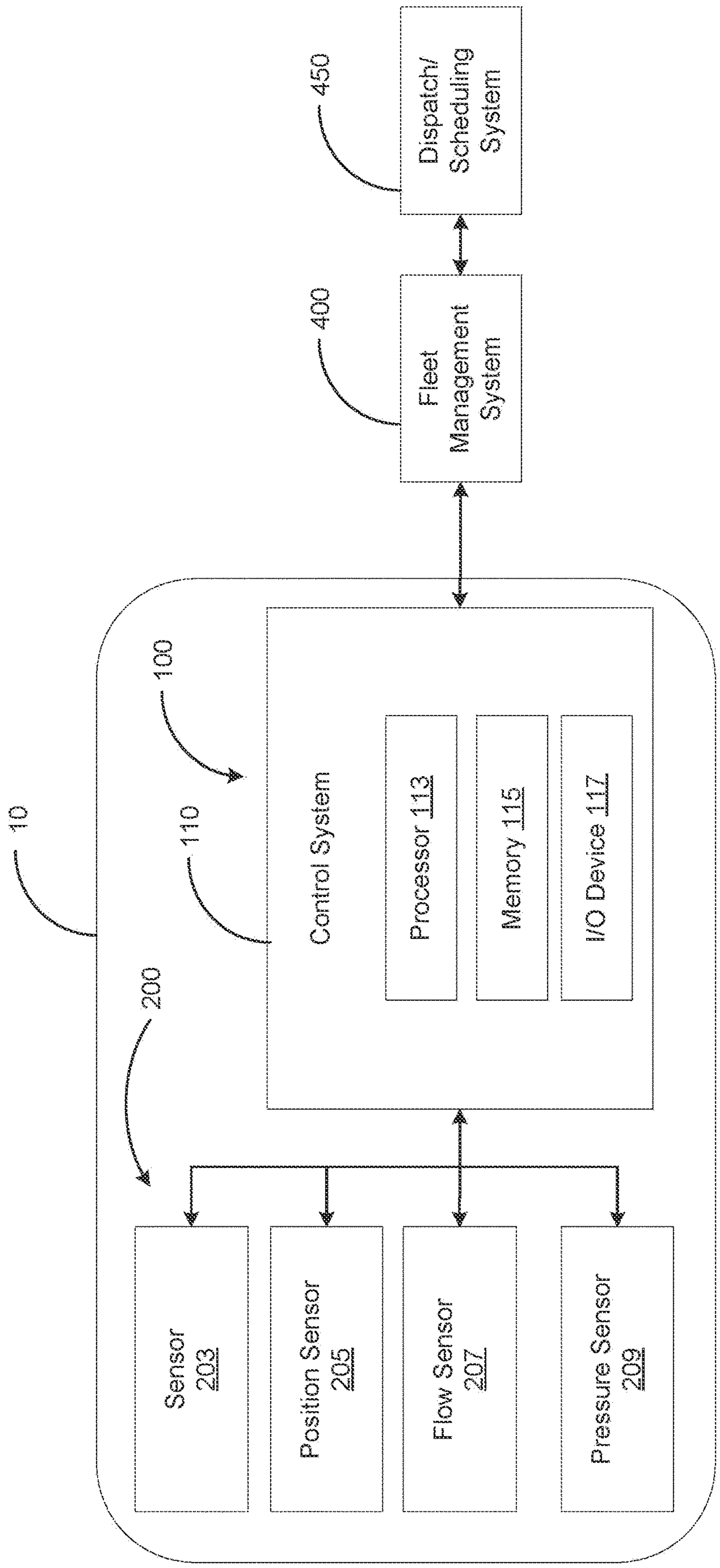
FIG. 4 is a schematic diagram of a status detection system for a concrete mixing truck, according to an exemplary embodiment.

FIG. 4 shows a block diagram of a status detection system 100, according to an exemplary embodiment. In one embodiment, the status detection system 100 includes one or more sensors, shown as sensors 200, and a control system, shown as control system 110. The sensors 200 may be coupled to the control system 110. In one embodiment, the control system 110 is onboard (e.g., in direct physical contact with other components of, in physical association with other components of, etc.) the concrete mixing truck 10. The control system 110 is also coupled to an external (e.g., not onboard the concrete mixing truck 10, etc.) computing system shown as fleet management system 400. The fleet management system 400 may be or include a processing circuit configured to analyze information from the control system 110 and provide analyzed, synthesized, raw, translated, enriched, and/or processed information to a user (e.g., via a web portal, etc.). The fleet management system 400 may additionally or alternatively provide analyzed, synthesized, raw, translated, enriched, and/or processed information to a dispatch/scheduling system 450. The dispatch/scheduling system 450 may be or include a processing circuit configured to monitor the status, location, or other information about a plurality of concrete mixing trucks 10 (e.g., as provided by or based on information from the fleet management system 400, etc.) and coordinate where or when to send certain concrete mixing trucks 10. Accordingly, the control system 110 may determine when a certain concrete mixing truck 10 has started to pour at a jobsite, has stopped pouring at a jobsite, has started to washout one or more components of the concrete mixing truck 10 (e.g., the concrete mixing drum, the chutes, etc.), has finished washing out one or more components of the concrete mixing truck 10, etc. and provide that information to the fleet management system 400 and/or to the dispatch/scheduling system 450 so that the dispatch/scheduling system 450 can use that information as part of a dispatch/scheduling system 450. Use of such information may facilitate more efficient dispatching of the concrete mixing trucks 10, scheduling of jobs, and/or use of concrete. In some embodiments, such as the embodiments of FIGS. 1-3, the status detection system 100 is positioned on the concrete mixing vehicle and/or the drum assembly.

The control system 100 includes a processor 113, a memory 115, and an input/output device 117. The control system 110 is configured to determine (e.g., by the processor 113) an operational status of the concrete mixing vehicle 10 and/or the drum assembly. According to an exemplary embodiment, the control system 110 is configured to utilize signals (e.g., data, etc.) available on the vehicle (e.g., from a vehicle controller area network (CAN) bus, sensor signals, command signals for specific components, etc.) to determine the operational status without requiring an operator input. In some embodiments, the control system 110 is configured to automatically determine if a concrete mixer truck is (a) starting a concrete pour (e.g., state 5) and/or (b) ending a concrete pour (e.g., state 6) and/or (c) start of wash (e.g., state 7) and/or (d) end of wash (e.g., state 8) based on sensor inputs from sensors (e.g., sensors 200) within the concrete mixing vehicle 10 and/or command outputs to components of the concrete mixing vehicle 10. The control system 110 is also configured to generate one or more timestamps indicating when the concrete mixing vehicle 10 and/or the drum assembly changed operational states. The timestamps are determined, logged, and transmitted wirelessly by the control system 110 in real time. The timestamps may be transmitted to an external computing system (e.g., the fleet management system 400 and/or the dispatch/scheduling system 450). In some embodiments, the timestamps may be made available to a third party via a real-time data feed (e.g., an application programming interface, etc.) that is integrated into one or more third party dispatch/scheduling systems.

In some embodiments, such as the embodiments shown in FIGS. 1 and 2, the control system 110 may be coupled to and/or part of a vehicle controller area network (CAN) bus. The control system 110 may be configured to receive signals from other devices such as sensing devices (e.g., the sensors 200) coupled to the CAN bus. In some embodiments, the control system 110 is coupled directly to one or more sensors (e.g., the sensors 200, etc.). The control system 110 may be configured to receive sensor signals from the one or more sensors. In some embodiments, the sensors 200 are coupled to one or more components of the concrete mixing vehicle 10 and/or the drum assembly. The sensors 200 may be configured to detect command signals of one or more components of the concrete mixing vehicle 10 and/or the drum assembly and provide the signals to the control system 110. In some embodiments, the control system 110 may be coupled to the one or more components of the cab 16 that facilitate operation of the concrete mixing truck 10.

The control system 110 also includes at least one input/output ("I/O") device 117. In some embodiments, the I/O device 117 is configured to send and/or receive data to an external computing system (e.g., fleet management system 400 and/or dispatch/scheduling 450). In some arrangements, the I/O device 117 are configured as cellular devices such that the control system 110 can send and receive data over a cellular network. In some embodiments, the I/O device also includes a user device such as a display. In these arrangements, the I/O device is configured to provide a user interface on the display.

Still referring to FIG. 4, the status detection system 100 includes one or more sensing devices, shown as sensors 200. The sensors 200 are configured to detect, provide, and/or receive information regarding at least one operational characteristic of the concrete mixing vehicle 10 and/or the drum assembly and provide at least one signal including the at least one operational characteristic. The sensors 200 may include sensing devices on the concrete mixing vehicle 10, on the drum assembly, and/or onboard the concrete mixing vehicle 10 in communication with the vehicle CAN bus. As shown, the sensors include a sensor 203 (e.g., a CAN bus interface, a vehicle network interface, etc.), a position sensor 205, a flow sensor 207, and/or a pressure sensors 209. In other embodiments, the sensors include a subset of such sensors, a different combination of sensors, additional sensors, etc. By way of example, the sensors 200 may include one or more switches or other components configured to provide information regarding the operational status, position, and/or configuration of one or more components of the concrete mixing truck 10 (e.g., the orientation of the chutes, whether a door to the cab of the concrete mixing truck 10 is open or closed, etc.). The sensors 200 may be coupled to the control system 110 directly or indirectly (e.g., via the CAN bus) such that the control system 110 can receive a signal including the operational characteristic from the sensors 200.

According to an exemplary embodiment, one or more of the sensors 200 may detect (e.g., sense and/or receive information regarding) a first signal indicating a first operational state of the concrete mixing vehicle 10 and/or the drum assembly. The sensors 200 then provide a first data signal including a first operational characteristic associated with the first operational state of the concrete mixing vehicle 10 and/or the drum assembly. The control system 110 may determine, based on the first operational characteristic, that the concrete mixing vehicle 10 and/or the drum assembly began pouring the concrete mixture (e.g., state 5). The control system 110 may then automatically generate a first timestamp indicating when the concrete mixing vehicle 10 and/or the drum assembly began pouring the concrete mixture. Additionally, the sensors 200 may detect a second signal indicating a second operational state of the concrete mixing vehicle 10 and/or the drum assembly. The sensors 200 then provide a second data signal including a second operational characteristic associated with the second operational state of the concrete mixing vehicle 10 and/or the drum assembly. The control system 110 may determine, based on the second operational characteristic, that the concrete mixing vehicle 10 and/or the drum assembly stopped pouring the concrete mixture (e.g., state 6). The control system 110 may then automatically generate a second timestamp indicating when the concrete mixing vehicle 10 and/or the drum assembly stopped pouring the concrete mixture.

In an additional exemplary embodiment, the sensors 200 may detect a third signal indicating a third operational state of the concrete mixing vehicle 10 and/or the drum assembly. The sensors 200 may provide a third data signal including a third operational characteristic associated with the third operational state of the concrete mixing vehicle 10 and/or the drum assembly. The control system 110 may determine, based on the third operational characteristic, that the concrete mixing vehicle 10 and/or the drum assembly began a wash (e.g., state 7). The control system 110 may then automatically generate a third timestamp indicating when the concrete mixing vehicle 10 and/or the drum assembly began washing the mixing drum 20. Additionally or alternatively, the sensors 200 may detect a fourth signal indicating a fourth operational state of the concrete mixing vehicle 10 and/or the drum assembly. The sensors 200 may provide a fourth data signal including a fourth operational characteristic associated with the fourth operational state of the concrete mixing vehicle 10 and/or the drum assembly. The control system 110 may determine, based on the fourth operational characteristic, that the concrete mixing vehicle 10 and/or the drum assembly stopped washing the mixing drum 20 (e.g., state 8). The control system 110 may then automatically generate a fourth timestamp indicating when the concrete mixing vehicle 10 and/or the drum assembly stopped washing the mixing drum 20.

In some embodiments, the sensor 203 may be configured to sense, detect, and/or receive a signal from or provided to one or more control modules on the concrete mixing vehicle 10 and/or the drum assembly. The sensor 203 may also be configured to provide a data signal including an operational status of the control module to the control system 110. In some embodiments, the sensor 203 is configured as an interface (e.g., a CAN bus interface, a vehicle network interface, etc.) such that the sensor 203 can sense, detect, and/or receive a signal including the operational characteristic from one or more of a control module, the CAN bus, the vehicle network, and the like. In an exemplary embodiment, the sensor 203 is configured to sense, detect, and/or receive a signal from a control module. The signal may include an operational status of the control module (e.g., vehicle speed, engine RPM, drum rotation direction, the status of a button, joystick, or other user input device, flow through a washout water line, whether a washout pump is engaged or commanded to be engaged, etc.). The sensor 203 is also configured to provide a data signal including the operational status of the control module to the control system 110. The control system 110 may determine an operational status of the concrete mixing vehicle 10 and/or the drum assembly based on the data signal.

In a first exemplary embodiment, the sensor 203 may be configured to detect operational command signals from a mixer control module. The mixer control module may be configured to operate the mixing drum 20 (e.g., by operating the drum drive 32) to selectively dispense the concrete mixture therein. The sensor 203 may be configured to sense, detect, and/or receive a first command signal that instructs the mixer control module to operate the drum drive 32 to dispense the concrete mixture (e.g., state 5). The sensor 203 may provide a first data signal including a first operational characteristic associated with the first command signal to the control system 110. Additionally, the sensor 203 may be configured to sense, detect, and/or receive a second command signal that instructs the mixer control module to stop operation of the drum drive 32 such that the mixing drum 20 stops dispensing the concrete mixture (e.g., state 6). The sensor 203 may provide a second data signal including a second operational characteristic associated with the second command signal to the control system 110. The control system 110 may determine (a) that the concrete mixing vehicle 10 has started pouring the concrete mixture (e.g., state 5), based on the first data signal, and (b) that the concrete mixing vehicle 10 has stopped pouring the concrete mixture (e.g., state 6), based on the second data signal.

In a second exemplary embodiment, the sensor 203 may be configured to sense, detect, and/or receive a signal from an engine control module. The signal may include an operational status of the engine control module (e.g., vehicle speed, engine RPM, etc.). The sensor 203 may additionally or alternatively detect information relating to drum rotation direction, the status of a button, joystick, or other user input device, flow through a washout water line, whether a washout pump is engaged or commanded to be engaged, etc. The sensor 203 may be configured to provide a data signal including an operational status of the engine control module to the control system 110. The control system 110 may determine an operational status of the concrete mixing vehicle 10 and/or the drum assembly based on the data signal. For example, the control system 110 may determine (a) that the concrete mixing vehicle 10 has stopped pouring the concrete mixture (e.g., state 6) and/or (b) that the concrete mixing vehicle 10 has stopped washing the mixing drum 20 (e.g., state 8) based on the vehicle speed being greater than a threshold speed (e.g., 10 mph, 20 mph, etc.).

In a third exemplary embodiment, the sensor 203 may be configured to detect operational command signals from a chute control module that controls the operation of chute 60. In these embodiments, the sensor 203 is configured to detect a first command signal with instructions to lower the chute 60 and provide a first data signal including a first operational characteristic associated with the first command signal to the control system 110. The sensor 203 may also be configured to detect a second command signal with instructions to raise the chute 60 and provide a second data signal including a second operational characteristic associated with the second command signal to the control system 110. The control system 110 may determine an operational status of the concrete mixing vehicle 10 and/or the drum assembly based on the data signal. For example, the control system 110 may determine (a) that the concrete mixing vehicle 10 has started pouring the concrete mixture (e.g., state 5) and/or (b) that the concrete mixing vehicle 10 has stopped pouring the concrete mixture (e.g., state 6) based on the chute being in a raised position or a lowered position.

The position sensor 205 is configured to sense, detect, and/or receive information regarding a position of concrete mixing vehicle 10 and/or the drum assembly. For example, the position sensor 205 may utilize a GPS signal to sense, detect, and/or receive information regarding the position of the concrete mixing vehicle 10 and/or the drum assembly. The position sensor 205 may provide a first data signal including a first operational characteristic associated with a first position of the mixing vehicle 10 and/or the drum assembly. The first position may be associated with a work location. Additionally, the position sensor 205 may provide a second data signal including a second operational characteristic associated with a second position of the mixing vehicle 10 and/or the drum assembly. The second position may be associated with a location away from the work location. The control system 110 may determine an operational status of the concrete mixing vehicle 10 and/or the drum assembly based on the first data signal and/or the second data signal. For example, the control system 110 may determine (a) that the concrete mixing vehicle 10 has started pouring the concrete mixture (e.g., state 5) and/or (b) that the concrete mixing vehicle 10 has stopped pouring the concrete mixture (e.g., state 6) based on the concrete mixing vehicle 10 arriving at a work location and leaving a work location, respectively.

The flow sensor 207 is configured to sense, detect, and/or receive information regarding a fluid (e.g., water, etc.) flowing through a fluid line. That is, the flow sensor 207 is configured to detect when a fluid is flowing through a fluid line (e.g., a hard line tube, a hose, etc.). In some embodiments, the fluid flows into the mixing drum 20 to wash the mixing drum 20. In some embodiments, the flow sensor 207 is configured as a pressure sensor (e.g., pressure sensor 209). In these embodiments, the flow sensor 207 and/or the pressure sensor 209 is configured to sense, detect, and/or receive information regarding conditions indicative of when a fluid is flowing through a fluid line. For example, after the pouring the concrete mixture, the concrete mixing vehicle 10 and/or the drum assembly may be configured to dispense a fluid into the mixing drum 20 to prevent any remaining concrete from hardening on the inner surface of the mixing drum 20. Accordingly, the flow sensor 207 is configured to detect when the fluid began flowing through the fluid line and into the mixing drum 20. The flow sensor 207 may be configured to provide a data signal including an operational characteristic indicating when the fluid began flowing through the fluid line. The control system 110 may determine, based on the operational characteristic, (a) that the concrete mixing vehicle 10 and/or the drum assembly stopped pouring the concrete mixture (e.g., state 6) and/or (b) that the concrete mixing vehicle 10 and/or the drum assembly began washing the mixing drum 20 (e.g., state 7). Additionally, the flow sensor 207 may be configured to detect when the fluid stops flowing through the fluid line. The flow sensor 207 may be configured to provide a data signal including an operational characteristic indicating when the fluid stopped flowing through the fluid line. The control system 110 may determine, based on the operational characteristic that the concrete mixing vehicle 10 and/or the drum assembly stopped washing the mixing drum 20.

The pressure sensor 209 is configured to detect a suspension pressure. In particular, the pressure sensor 209 is configured to sense a change in a suspension pressure. For example, the pressure sensor may detect that the pressure in one or more components of the suspension is changing. The pressure sensor 209 is configured to provide a first data signal including a first operational characteristic associated with an initial change in pressure. The control system 110 may determine, based on the first operational characteristic that the concrete mixing vehicle 10 and/or the drum assembly began pouring concrete. That is, the suspension pressure changes due to the weight of the concrete mixing vehicle 10 and/or the drum assembly decreasing because the concrete mixture is being dispensed. Additionally, the pressure sensor 209 is configured to provide a second data signal including a second operational characteristic associated with a constant suspension pressure. The control system 110 may determine, based on the second operational characteristic that the concrete mixing vehicle 10 and/or the drum assembly stopped pouring concrete. That is, the suspension pressure stopped changing due because the concrete mixture stopped being dispensed.

Figure 5:
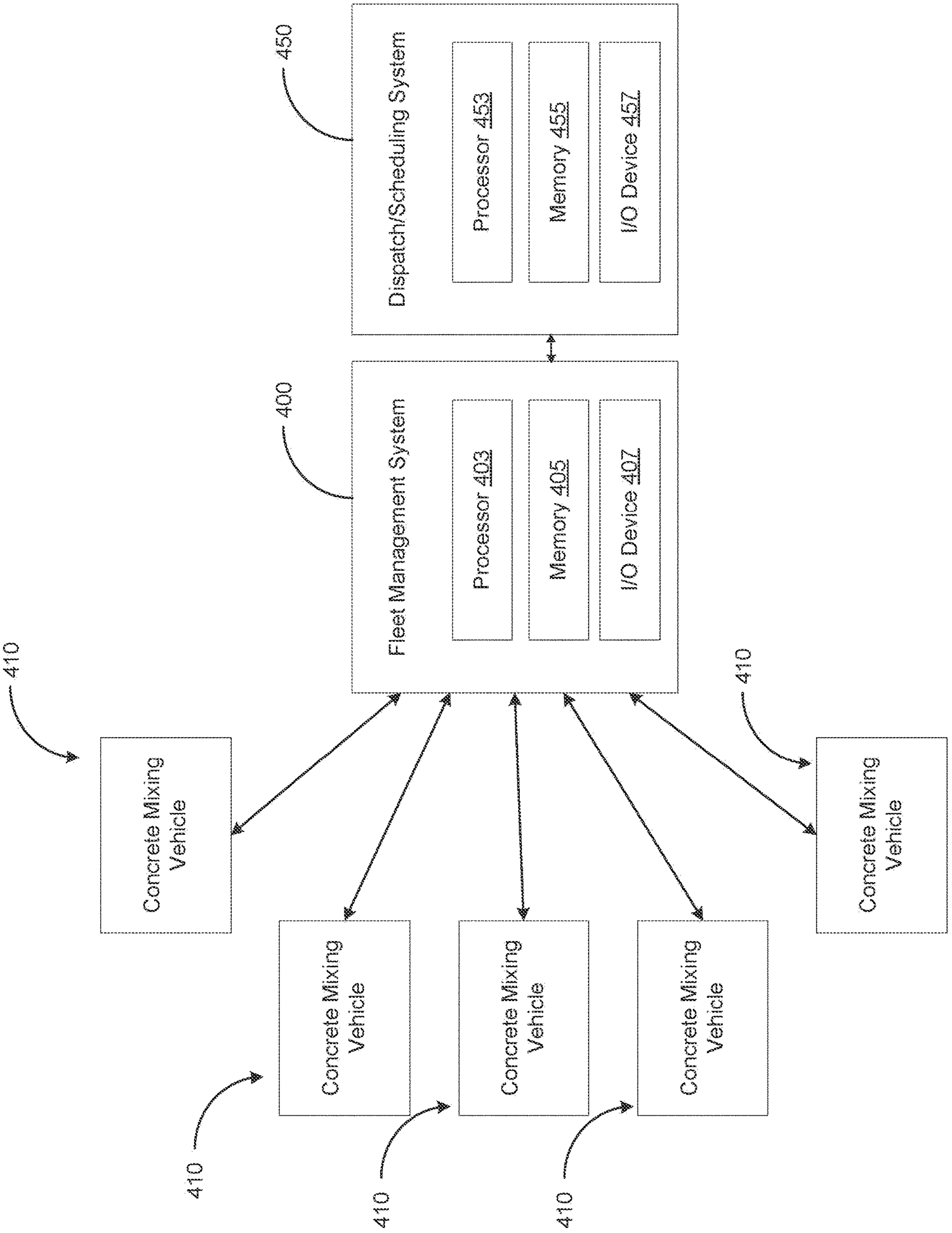
FIG. 5 is a schematic diagram of a fleet management system, according to an exemplary embodiment.

Now referring to FIG. 5, a block diagram of the fleet management system 400 is shown, according to an exemplary embodiment. The fleet management system 400 includes a processor 403, a memory 405, and an input/output device 407. As shown, the fleet management system 400 is configured to receive data and timestamps from a plurality of concrete mixing vehicles 410 (e.g., the concrete mixing vehicle 10 in FIGS. 1-3). The processor 403 may be configured to analyze information from the control system 110 of each of the plurality of concrete mixing vehicles 410 and provide analyzed, synthesized, raw, translated, enriched, and/or processed information to a user (e.g., via a web portal, etc.). Additionally, the fleet management system 400 may be configured to be communicably and/or operably coupled to a dispatch/scheduling system 450. The dispatch/scheduling system 450 similarly includes a processor 453, a memory 455 and an I/O device 456. The fleet management system 400 may provide analyzed, synthesized, raw, translated, enriched, and/or processed information to the dispatch/scheduling system 450. In some embodiments, the fleet management system 400 and/or the dispatch/scheduling system 450 is a distributed computing system (e.g., a cloud based computing system, etc.) that is hosted on one or more physical servers.

In some embodiments, the dispatch/scheduling system 450 is configured to receive data from the fleet management system 400. The data may include one or more of a timestamp (e.g., the first timestamp, the second timestamp, the third timestamp, and the fourth timestamp), an operational characteristic, an operational status, etc. The processor 453 of the dispatch/scheduling system 450 may be configured to monitor the status, location, or other information about a plurality of concrete mixing vehicles 410 (e.g., as provided by or based on information from the fleet management system 400, etc.) and coordinate where or when to send certain concrete mixing vehicles 410. Accordingly, the fleet management system 400 may determine an operational status of the concrete mixing vehicles 410 (e.g., as provided by an onboard control system such as control system 110) and provide operational status information to the dispatch/scheduling system 450 so that the dispatch/scheduling system 450 can facilitate more efficient dispatching of the concrete mixing vehicles 410, scheduling of jobs, and/or use of concrete.

In some embodiments, the I/O device 407 and/or the I/O device 457 is configured to send and/or receive data from the I/O devices of each of the concrete mixing vehicles 410 (e.g., the I/O device 117 of FIG. 4). In some arrangements, the I/O device 407 and/or the I/O device 457 is configured as a cellular device such that the fleet management system 400 and/or the dispatch/scheduling system 450 can send and receive data over a cellular network.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the concrete mixer truck 10, status detection system 100, and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A vehicle, comprising:

a chassis;

a cab;

a drum coupled to the chassis and configured to mix a concrete mixture received therein and selectively dispense the concrete mixture;

a chute operable between a raised position and a lowered position such that, when in the lowered position, the chute is configured to receive the concrete mixture from the drum and provide the concrete mixture to a work location;

a sensor configured to detect data corresponding to one or more operational characteristics, wherein a first operational characteristic of the one or more operational characteristics includes an indication of whether the concrete mixture is being dispensed via the chute, and a second operational characteristic of the one or more operational characteristics includes an indication of whether the concrete mixture has stopped being dispensed via the chute; and a control system configured to:

receive the data from the sensor;

determine, based on the data, when the vehicle entered an operational state;

generate one or more timestamps indicating when the vehicle entered the operational state, the one or more timestamps including a first time stamp generated responsive to detecting the first operational characteristic; and provide the one or more timestamps and the operational state to a fleet management system.

2. The vehicle of claim 1, wherein the control system is disposed onboard, in physical association with at least one of the chassis, the cab, the drum, or the chute such that the one or more timestamps and the operational state originate from onboard the vehicle.

3. The vehicle of claim 1, wherein:

a third operational characteristic of the one or more operational characteristics includes an indication of whether a wash cycle has started; and a fourth operational characteristic of the one or more operational characteristics includes an indication of whether the wash cycle has ended.

4. The vehicle of claim 1, wherein the sensor configured to:

detect a first operational command signal of a mixer control module, the first operational command signal corresponding with the first operational characteristic; and detect a second operational command signal of the mixer control module, the second operational command signal corresponding with the second operational characteristic.

5. The vehicle of claim 1, wherein the sensor configured to:

detect a first operational command signal of a chute module, the first operational command signal corresponding with the first operational characteristic; and detect a second operational command signal of the chute module, the second operational command signal corresponding with the second operational characteristic.

6. The vehicle of claim 1, wherein the sensor is configured to detect a first operational signal from an engine control module, wherein the first operational signal corresponds to the second operational characteristic.

7. The vehicle of claim 1, wherein the sensor comprises at least one of a position sensor, a flow sensor, and a pressure sensor.

* * * * *